Figure 1:
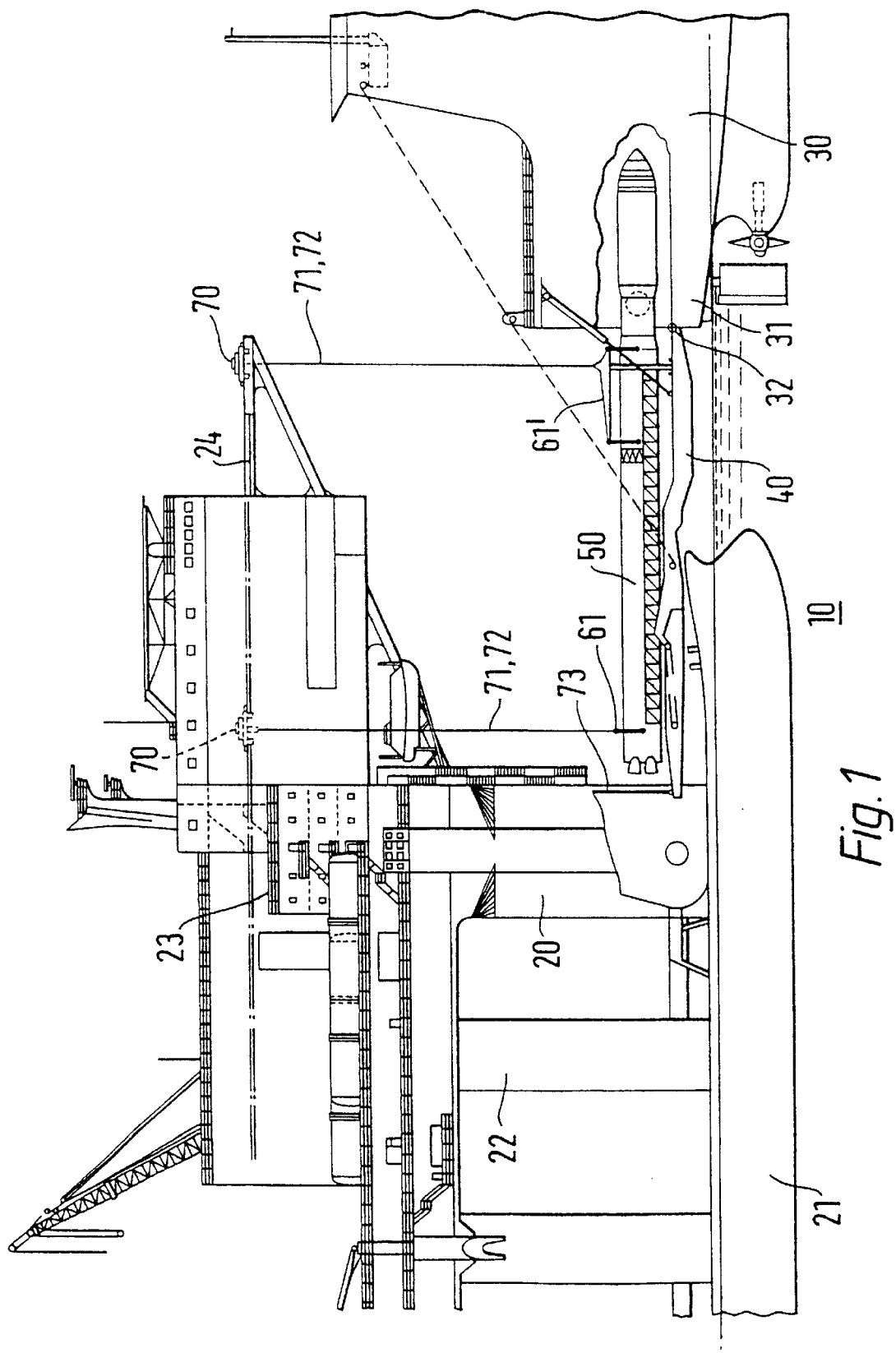

ID="1" />

United States Patent
Kindem et al.

[11] Patent Number: 6,024,006
[45] Date of Patent: Feb. 15, 2000

[54] METHOD FOR TRANSFERRING A HORIZONTALLY ARRANGED ROCKET FROM A VESSEL TO A FLOATING STRUCTURE LOCATED AT SEA

[75] Inventors: Bjørn Kindem, Kråkerøy; Per Herbert Kristensen, Rykkin; Bjørn Reidar Lien, Oslo, all of Norway

[73] Assignee: Kvaerner Maritime AS, Lysaker, Norway

[21] Appl. No.: 09/125,396

[22] PCT Filed: Feb. 18, 1997

[86] PCT No.: PCT/NO97/00050

§ 371 Date: Aug. 18, 1998

§ 102(e) Date: Aug. 18, 1998

[87] PCT Pub. No.: WO97/29947

PCT Pub. Date: Aug. 21, 1997

[30] Foreign Application Priority Data

Feb. 19, 1996 [NO] Norway .................................. 96 0658

[51] Int. Cl.⁷ ........................................................ F41A 9/00
[52] U.S. Cl. ...................... 89/1.801; 89/1.805; 89/1.809; 89/1.815; 414/137.9; 414/138.4; 114/292
[58] Field of Search ................................ 89/1.801, 1.802, 89/1.804, 1.805, 1.809, 1.81, 1.815, 1.8; 43/6.5; 414/282, 283, 137.9, 22.54, 138.4 292; 14/27

[56] References Cited

U.S. PATENT DOCUMENTS

| | | | |
|---|---|---|---|
| H683 | 10/1989 | Brubaker | 89/1.802 |
| 175,019 | 3/1876 | Borgfeldt | 114/292 |
| 834,335 | 10/1906 | Taylor | 414/138.4 |
| 3,284,888 | 11/1966 | McClain et al. | 89/1.801 |
| 3,303,740 | 2/1967 | Grayson et al. | 89/1.815 |
| 3,831,311 | 8/1974 | Cushing | 43/6.5 |
| 4,444,087 | 4/1984 | Hunter et al. | 89/1.802 |
| 4,590,634 | 5/1986 | Williams | 14/27 |
| 4,747,334 | 5/1988 | Kuriiwa | 89/1.802 |
| 4,839,062 | 6/1989 | Sanders | 43/6.5 |
| 4,916,999 | 4/1990 | Palmer et al. | 89/1.815 |
| 4,998,369 | 3/1991 | Lamon | 43/6.5 |
| 5,032,040 | 7/1991 | Ingle | 14/27 |
| 5,042,358 | 8/1991 | Kuriiwa | 89/1.815 |
| 5,191,162 | 3/1993 | Czimmek | 89/1.802 |
| 5,379,863 | 1/1995 | Sugawara et al. | 414/282 |
| 5,649,333 | 7/1997 | Chernjawski | 14/27 |
| 5,845,875 | 12/1998 | Deel | 244/63 |
| 5,908,999 | 6/1999 | Kristensen et al. | 89/1.801 |
| 5,918,306 | 6/1999 | Kristensen et al. | 89/1.801 |
| 5,932,830 | 8/1999 | Kristensen et al. | 89/1.801 |

FOREIGN PATENT DOCUMENTS

| | | |
|---|---|---|
| 57165 | 8/1982 | European Pat. Off. ............ 89/1.801 |
| 3315888A1 | 11/1984 | Germany . |
| 951693 | 5/1995 | Norway . |
| 951694 | 5/1995 | Norway . |
| 951695 | 5/1995 | Norway . |
| 2070554A | 9/1981 | United Kingdom . |
| WO9634795 | 11/1996 | WIPO . |

*Primary Examiner*—Michael J. Carone
*Assistant Examiner*—Fredrick T. French, III
*Attorney, Agent, or Firm*—Birch, Stewart, Kolasch & Birch, LLP

[57] ABSTRACT

In a method for transferring a horizontally arranged rocket from a vessel to a floating structure, a ramp is provided in a position projecting out from the vessel, entirely or partially below a lifting device provided on a floating structure, and is connected to the floating structure. The rocket is moved completely or partially out on the ramp, and is lifted over to the floating structure by the floating structure's lifting device.

9 Claims, 3 Drawing Sheets

METHOD FOR TRANSFERRING A HORIZONTALLY ARRANGED ROCKET FROM A VESSEL TO A FLOATING STRUCTURE LOCATED AT SEA

This application is the national phase under 35 U.S.C. §371 of prior PCT International Application No. PCT/NO97/00050 which has an International filing date of Feb. 18, 1997 which designated the United States of America, the entire contents of which are hereby incorporated by reference.

The invention concerns a method for transferring a horizontally arranged rocket from a vessel to a floating structure located at sea, wherein the rocket contains a payload which, e.g., has to be transported into space, and wherein the transfer is effected by bringing the rocket entirely or partially to a ramp, from which it is lifted in a horizontal position over to the floating structure.

Large rockets for transport of payloads into space may be 50 m or more in length. Such rockets contain a number of sophisticated technical systems, such as mechanical, electrical and optical systems, and both the rocket's technical systems and structural design are highly optimized with regard to weight. On account of this optimization the rockets are principally designed in order to withstand the loads to which they are exposed during launching, while they are only designed for small external stresses, such as stresses generated by wave movement and weather conditions.

The actual rocket consists of several stages and a payload, which, e.g., may be a satellite. The different stages and the payload are built separately and subsequently brought to an assembly location.

Due to the earth's rotation the equator is the most favourable place for launching rockets. However, the assembly and preparation of a large rocket requires substantial resources both in the form of expertise and material, and the availability of such resources is best in areas which are not situated at the equator.

Norwegian patent applications 951693, 951694 and 951695 describe the assembly and launch of rockets where the rocket is assembled in a horizontal position on board a vessel, and subsequently brought aboard a transportable floating platform for transport to a launch site and launching. The rocket can thereby be launched at the equator, while at the same time all the technical aids and technical expertise are easily available, since the aids and expertise can be present on board the vessel or platform. The above-mentioned patent applications do not, however, describe how the rocket is transferred from the vessel to the platform.

A vessel and a floating structure, such as a launch platform for a rocket, will normally have different movements in the water. The movements are mainly due to the influence of the waves, and the differences in movement are due to the fact that the vessel and the floating structure have different shapes and masses, and also that the influence of the waves on the vessel and the floating structure will be displaced in time in relation to each other. When objects are transferred between two vessels at sea where the objects are lifted by means of a lifting device on one vessel, this difference in movement is a recognized problem, since the objects can bump against the other vessel and be damaged.

The object of the invention is to provide a method for transferring a horizontally arranged rocket from a vessel to a floating structure, where the rocket is only exposed to small stresses due to the different movements of the vessel and the floating structure.

The object is achieved according to the invention with a method of the type mentioned in the introduction, characterized by the features which are indicated in the claims.

Thus, by means of the present invention the differences in movement between the vessel and the floating structure are reduced by setting up a ramp between the vessel and the floating structure. The ramp is connected to the vessel in such a manner that a rocket can be transferred from the vessel to the ramp in a practical fashion, e.g. on a carriage, while the ramp is simultaneously connected to the floating structure, thus holding the ramp completely or partially steady in relation thereto.

In a preferred embodiment the ramp is pivotally connected to the vessel, while a section of the ramp which is located furthest from the vessel is suspended in securing wires from the floating structure.

In this patent application the term "critical height" is understood to mean a minimum lifting height where there is no longer any risk of collision between the rocket and the base, especially a saddle.

Figure 2:
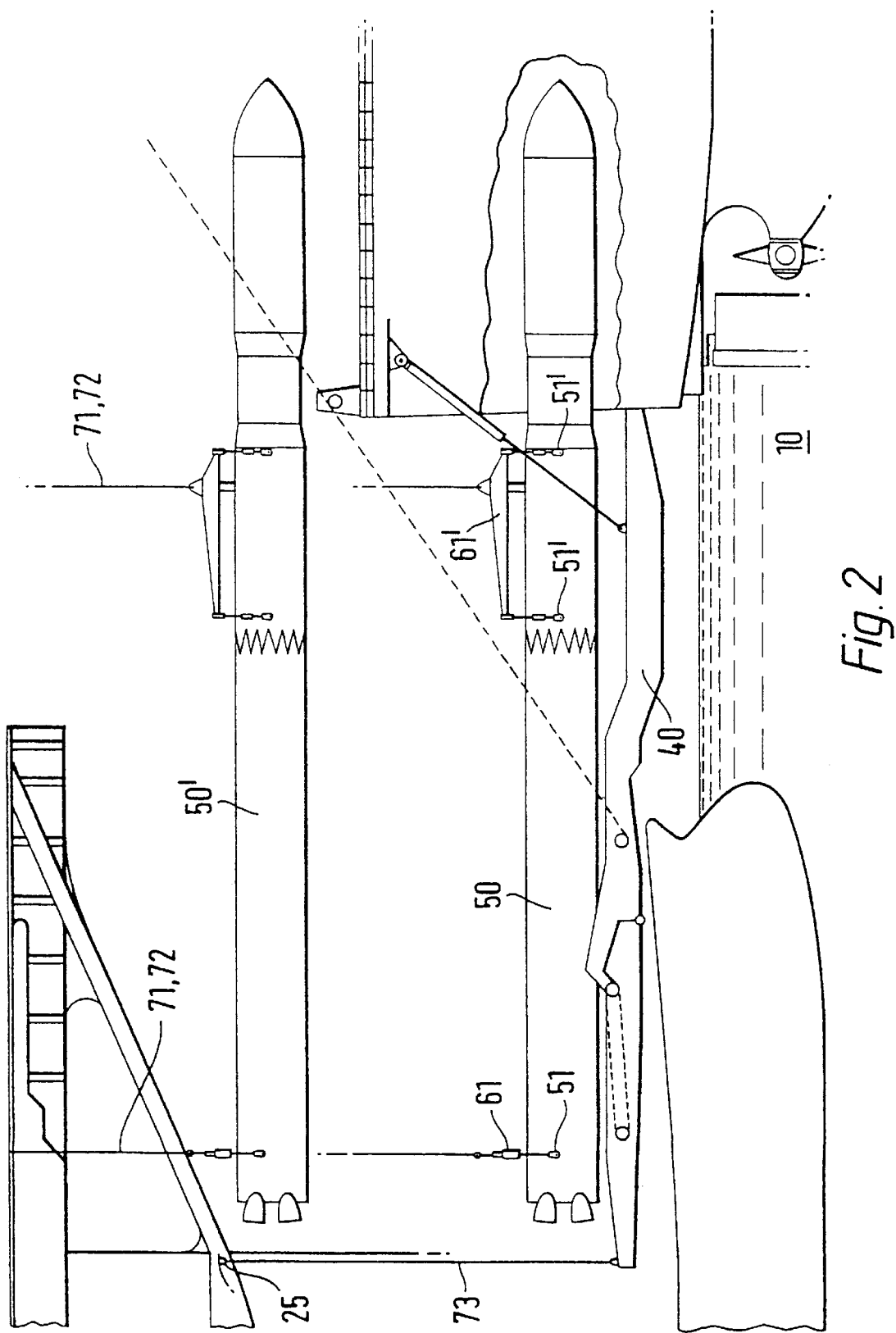
Figure 3:
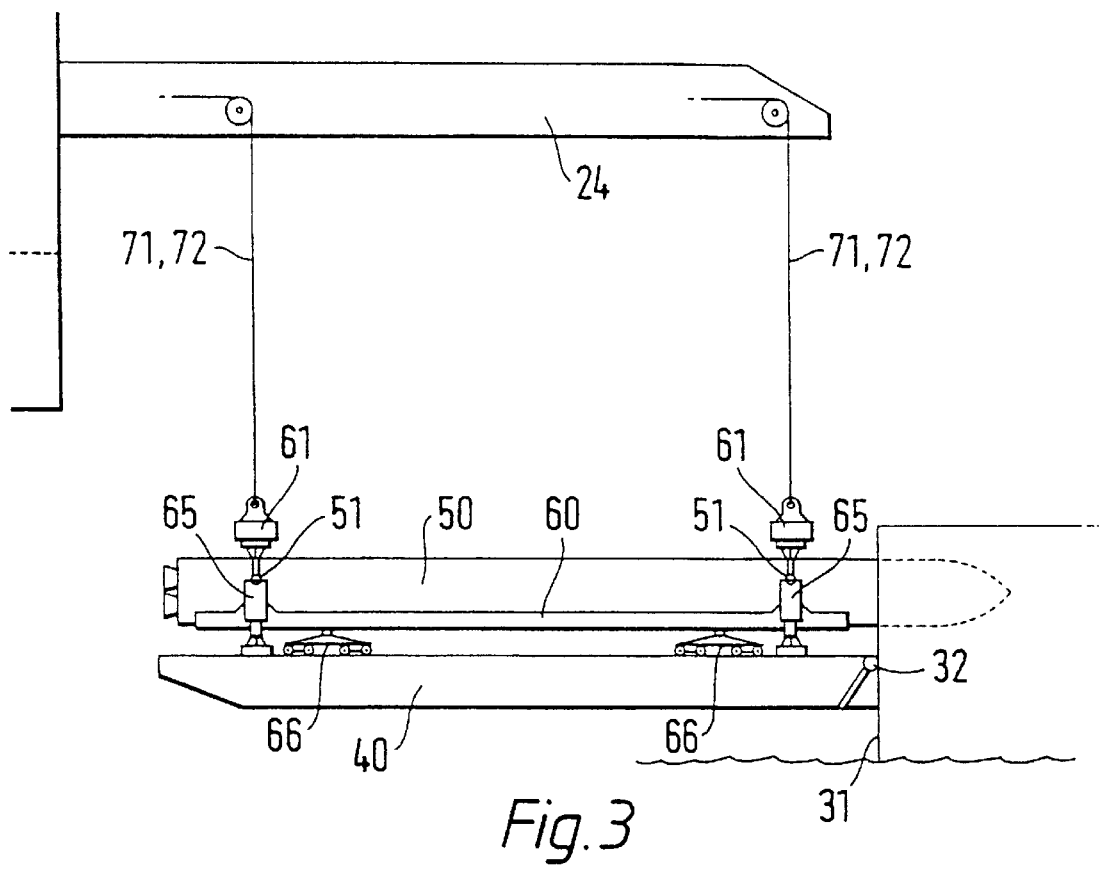
Figure 4:
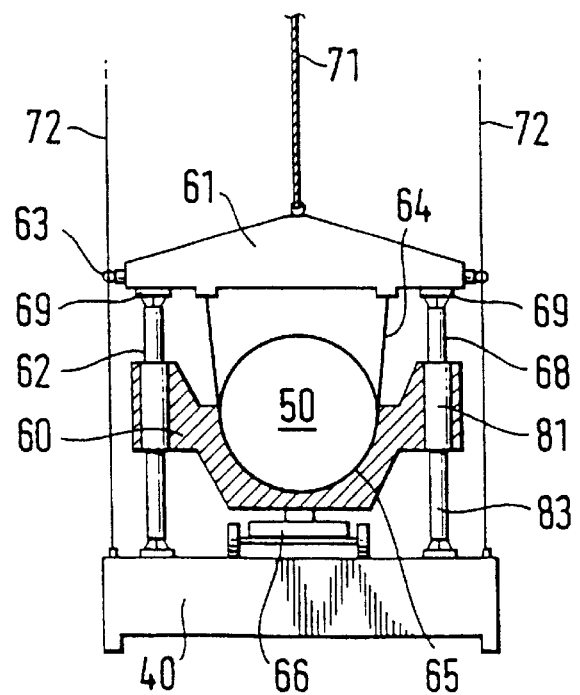

The invention will now be explained in more detail in connection with a description of a specific embodiment and with reference to the drawing, in which FIG. 1 is a side view of a rocket horizontally arranged on a ramp, FIG. 2 shows the rocket in two different positions during a vertical lift, FIG. 3 shows the rocket and the ramp in closer detail, and FIG. 4 shows a lifting yoke and a device for use in lifting.

The same reference numerals are used for corresponding parts in all the figures.

FIG. 1 illustrates a floating structure 20 with pontoons 21 and columns 22, floating at sea 10. On top of the columns 22 there is provided a deck structure 23 with a crane beam 24. Beside the floating structure there is located a vessel 30, of which only the stern 31 is shown. An elongated ramp 40 is placed in a position projecting out from the vessel 30, so that the ramp 40 is substantially located below the crane beam 24.

The end of the ramp which is located closest to the vessel is pivotally connected to the vessel about a horizontal axis 32, thus enabling the ramp to be rotated in relation to the vessel. The end of the ramp which is located furthest from the vessel 30 is connected to the floating structure 20 by being suspended in vertical securing wires 73 from an attachment point 25 on the floating structure. In this manner a ramp is obtained, one end of which is continuously connected to the vessel 30, and the other end of which has a constant vertical distance from the crane beam 24. The vessel's vertical movement will be transferred to the end of the ramp which is located closest to the vessel, while the floating structure's vertical movement will be transferred to the end of the ramp which is suspended in the wires 73. Thus the ramp forms a far better basis for a vertical lift of an object, in this case a rocket, than, e.g., the vessel's afterdeck.

When a rocket 50 is transferred from the vessel to the floating structure, the rocket is moved entirely or partially out on to the ramp 40 and lifted over to a floating structure by means of a lifting device 70, which in the illustrated embodiment is composed of lifting wires 71 from the crane beam 24.

FIG. 2 illustrates the lifting of the rocket, where the rocket is shown in two positions, a position on the ramp 40 before the lift, and a position 50' where the rocket has been lifted upwards in the direction of the crane beam 24. The rocket is lifted by means of two lifting yokes, a rear lifting yoke 61 in the form of a lifting beam, and a front lifting yoke 61' in the form of a frame. The rear lifting yoke 61 lifts the rocket 50 in two lifting lugs 51, while the front lifting yoke 61' lifts the rocket in four lifting lugs 51'.

FIG. 3 illustrates the rocket 50 and the ramp 40 in closer detail. It can be seen here how the rocket is placed on a cradle 60 which consists of a longitudinal supporting structure which in turn is placed on two carriages 66, in the form of bogies. The cradle 60 has saddles 65 which support the rocket during transport of the rocket to the ramp. In the embodiment illustrated in FIG. 3 the rocket's front and rear sections are lifted by two identical lifting yokes 61, both of which are in the form of lifting beams, for lifting the rocket in two lifting lugs 51.

FIG. 4 is a cross section through the rocket 50, the lifting yoke 61 and the cradle 60. Apart from the saddle 65 and the carriage 66 the cradle 60 includes two jacks 62. It also illustrates how the rocket is connected to the lifting yoke by two lifting slings or lifting stays 64.

The jacks 62 are provided as hydraulic jacks with vertical hydraulic cylinders 81 located at the outer edges of the cradle 60, furthest away from the rocket 50. The piston rods 68 with lifting blocks 69 extend vertically upwards from the hydraulic cylinders 81, and the lifting blocks 69 abut against the underside of the extreme points of the lifting yoke 61. The jacks are further provided with extensible legs 83 in the extension of the cylinders 81 in order to support the jacks and transfer vertical forces from the jacks to the ramp.

FIG. 4 also illustrates two vertical guide wires 72, which extend parallel to the lifting wires 71 from the ramp 40 to the crane beam 24, and are passed through guides 63 in the extreme points of the lifting yoke 61. Before lifting, the guide wires 72 are tightened by means of suitable devices, e.g. jigger winches, to a suitable tension, e.g. 10 tons per wire, so that their potential horizontal movement is very limited.

During a lift with the cradle 60 illustrated in FIG. 4 the lifting yoke 61 is jacked up with the rocket 50 from the ramp in the introductory phase of the lift by means of the jacks 62, with the result that the rocket follows the ramp's movements and does not bump against the saddles 65. After the jacking up has reached a critical height for the lift, the tension in the lifting wires 71 is increased, thus transferring the weight of the lifting yoke 61 with the rocket 50 from the jacks to the lifting wires, whereupon the lifting continues by means of the lifting wires in the known manner. The piston rods 68 with the lifting blocks 69 are lowered as quickly as possible after the weight has been transferred to the lifting wires, for example by rapid drainage of hydraulic fluid, thus preventing the rocket from bumping against the piston rods or the lifting blocks in the event of an inadvertent movement during the continuation of the lift.

The rocket's horizontal movement is kept under control both during the introductory phase and the later phase of the lift by guiding the lifting yoke in the lateral direction of the guide wires 72.

The invention has been described in the above with regard to one specific embodiment. It is obvious, however, that several variations are possible within the scope of the invention. For example, the lifting yoke 61 can be designed in several ways, such as a combination of two or more beams, or a lifting frame. Similarly, it is possible to transfer the weight of the rocket to the lifting yoke in several ways, either with permanently mounted lifting lugs as illustrated, or, e.g., by letting the rocket rest in a cradle of rigid or flexible material, thus permitting the forces to be transferred uniformly from the cylindrical outer side of the rocket to the lifting slings or lifting stays.

Furthermore, the attachment of the ramp to both the vessel and the floating structure can be varied in several ways. Instead of the ramp being suspended in vertical securing wires, it is possible, e.g., to attach the ramp to one of the floating structure's pontoons or columns. A second alternative is for the ramp to be provided partially floating in the water, which can reduce the requirement for load-carrying capacity for the vessel and/or the floating structure. A third alternative is to replace the ramp with a barge, which is connected to both the vessel and the floating structure in a suitable manner.

The above-mentioned and similar variations, which will be natural for a person skilled in the art, will all lie within the scope of the invention.

What is claimed is:

1. A method for transferring a horizontally arranged rocket (50) from a vessel (30) to a floating structure (20) located at sea (10), wherein the rocket (50) contains a payload to be transported into space, and wherein the transfer is effected by bringing the rocket (50) entirely or partially to a ramp (40), from which it is lifted in a horizontal position over to the floating structure (20), characterized in that the method contains the following stages:

a) the ramp (40) is placed in a position projecting out from the vessel (30), completely or partially below a lifting device (70) provided on the floating structure (20), b) the ramp (40) is connected to the floating structure (20), c) the rocket (50) is moved entirely or partially out on the ramp (40) and d) the rocket is lifted over to the floating structure (20) by means of the floating structure's (20) lifting device (70).

2. A method according to claim 1, characterized in that stage a) also entails the ramp (40) being pivotally connected to the vessel (30) about a horizontal axis (32).

3. A method according to claim 1, characterized in that stage a) also entails the ramp (40) being entirely or partially provided floating in the water (10).

4. A method according to claim 1 characterized in that stage b) entails the ramp (40) being connected to the floating structure (20) by vertical guiding and securing wires (73) attached to a portion of the ramp (40) which is located furthest away from the vessel (30), so that the ramp (40) is completely or partially suspended by the guiding and securing wires.

5. A method according to claim 4, characterized in that stage b) entails the ramp (40) being connected to the floating structure (20) by vertical guide wires (72) for use during lifting of the rocket (50).

6. A method according to claim 1 characterized in that stage c) entails the rocket (50) being moved completely or partially out on the ramp (40) on one or more carriages (66).

7. A method according to claim 1 characterized in that the lifting device (70) comprises lifting wires (71) suspended from a crane beam (24).

8. A method according to claim 1, characterized in that stage d) entails the rocket (50) being lifted over to the floating structure (20) by means of one or more lifting yokes (61).

9. A method according to claim 5, characterized in that stage d) entails the rocket (50) being guided in the horizontal direction by guide wires (72), the guide wires being passed through guides (63) provided in connection with the lifting yokes (61).

* * * * *